(12) United States Patent
Roy et al.

(10) Patent No.: US 6,365,885 B1
(45) Date of Patent: Apr. 2, 2002

(54) MICROWAVE PROCESSING IN PURE H FIELDS AND PURE E FIELDS

(75) Inventors: Rustum Roy; Jiping Cheng; Dinesh K. Agrawal, all of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/691,379

(22) Filed: Oct. 18, 2000

Related U.S. Application Data

(60) Provisional application No. 60/160,107, filed on Oct. 18, 1999.

(51) Int. Cl.⁷ .............................. H05B 6/64; H05B 6/74; H01L 21/326
(52) U.S. Cl. ...................... 219/750; 219/679; 219/745; 219/710; 148/565; 148/525
(58) Field of Search ................................. 219/678, 679, 219/710, 745, 750, 748; 148/565, 525, DIG. 3, DIG. 71; 438/328, 795, 799

(56) References Cited

U.S. PATENT DOCUMENTS

| | | | |
|---|---|---|---|
| 4,147,911 A | | 4/1979 | Nishitani .............. 219/10.55 M |
| 4,276,462 A | * | 6/1981 | Risman ....................... 219/750 |
| 4,501,717 A | | 2/1985 | Tsukamoto et al. ............ 419/58 |
| 4,622,447 A | * | 11/1986 | Inoue .......................... 219/679 |
| 4,719,078 A | | 1/1988 | Miyashita et al. ............. 419/53 |
| 4,942,278 A | | 7/1990 | Sheinberg et al. ... 219/10.55 M |
| 4,963,709 A | | 10/1990 | Kimrey, Jr. .......... 219/10.55 M |
| 5,010,220 A | | 4/1991 | Apte et al. ..................... 264/26 |
| 5,110,542 A | | 5/1992 | Conaway ..................... 419/25 |
| 5,164,130 A | | 11/1992 | Holcombe et al. ............ 264/26 |
| 5,184,286 A | | 2/1993 | Lauf et al. .................. 361/529 |
| 5,202,541 A | | 4/1993 | Patterson et al. .... 219/10.55 M |
| 5,266,762 A | * | 11/1993 | Hoffman et al. ............ 219/746 |
| 5,321,223 A | | 6/1994 | Kimrey, Jr. et al. ........ 219/745 |
| 5,380,702 A | | 1/1995 | Henty ......................... 505/480 |

(List continued on next page.)

FOREIGN PATENT DOCUMENTS

| | | | |
|---|---|---|---|
| JP | 63-294685 | * | 12/1988 |
| JP | 4-338644 | * | 11/1992 |

OTHER PUBLICATIONS

U.S. Application Serial No. 09/185,246, filed Nov. 3, 1998, dkt. A–65999/AJT.

J.W. Walkiewicz et al., "Microwave heating characteristics of selected minerals and compounds," *Minerals and Metallurgical Processing* (02/88), pp. 39–42.

M. Willert–Porada, et al., "Einsatz von Mikrowellen zum Sintern pulvermetallurgischer Produkte," *Metall*, 50 Jahrgang, Nr. 11/96, pp. 744–752.

A Gavin Whittaker, et al., "Microwave–assisted Solid–state Reactions involving Metal Powders," *J. Chem. Soc. Dalton Trans.* (1995), pp. 2073–2079.

Y. Fang, et al., "Microwave Sintering of Calcium Strontium Zirconium Phosphate Ceramics," *Microwaves II*, pp. 109–114.

(List continued on next page.)

Primary Examiner—Philip H. Leung
(74) Attorney, Agent, or Firm—Konrad Raynes Victor & Mann, LLP; Alan S. Raynes

(57) ABSTRACT

Embodiments include a process including providing a microwave radiation source and a processing chamber. The process includes generating a region of pure magnetic field from the microwave radiation in the processing chamber. A region of pure electric field from the microwave radiation is also generated. A material is positioned in the region of pure magnetic field while no portion of the material is positioned in the region of pure electric field, and the material is heated in the region of pure magnetic field. The heating may be conducted to sinter the material. The material may includes a metal.

14 Claims, 15 Drawing Sheets

U.S. PATENT DOCUMENTS

| | | |
|---|---|---|
| 5,397,530 A | 3/1995 | Narasimhan et al. .......... 419/1 |
| 5,472,650 A | 12/1995 | Johnson et al. ............. 264/432 |
| 5,597,782 A | 1/1997 | Henty ....................... 505/480 |
| 5,653,778 A | 8/1997 | Rutjes et al. ................. 65/64 |
| 5,702,501 A | 12/1997 | Osawa et al. ................ 75/255 |
| 5,720,917 A | 2/1998 | Matsuura et al. ........... 264/432 |
| 5,736,092 A | 4/1998 | Apte et al. ................. 264/432 |
| 5,772,701 A | 6/1998 | McMillan et al. ......... 29/25.03 |
| 5,796,079 A | 8/1998 | Kim et al. .................. 219/678 |
| 5,847,355 A | 12/1998 | Barmatz et al. ....... 219/121.59 |
| 5,848,348 A | 12/1998 | Dennis .......................... 419/5 |
| 5,858,037 A | 1/1999 | Sukumaran Jayan et al. . 51/309 |
| 5,874,377 A | 2/1999 | Apte et al. ................. 501/97.2 |
| 5,911,941 A | 6/1999 | Rokhvarger et al. ........ 264/432 |
| 6,004,505 A | 12/1999 | Roy et al. ...................... 419/6 |
| 6,011,248 A | 1/2000 | Dennis ....................... 219/700 |
| 6,054,693 A | 4/2000 | Barmatz et al. ............ 219/678 |
| 6,063,323 A | 5/2000 | Fuls et al. .................. 264/432 |
| 6,066,290 A | 5/2000 | Dennis et al. ................ 419/38 |
| 6,087,642 A | 7/2000 | Joines et al. ................ 219/693 |
| 6,126,895 A | 10/2000 | Dennis et al. ................. 419/9 |
| 6,163,020 A | 12/2000 | Bartusch et al. ........... 219/756 |
| 6,183,689 B1 | 2/2001 | Roy et al. ..................... 419/38 |
| 6,190,762 B1 | 2/2001 | Rodiger et al. ............. 428/325 |
| 6,228,484 B1 | 5/2001 | Willert-Porada et al. ... 428/336 |

OTHER PUBLICATIONS

Y. Fang, et al., "Microwave Sintering of Hydroxyapatite–Based Composites," *Microwaves II*, pp. 397–407.

Willard H. Sutton, "Microwave Processing of Ceramic Materials," *Ceramic Bulletin*, vol. 68, No. 2 (1989), pp. 376–386.

Y. Fang, et al., "Transparent mullite ceramics from diphasic aerogels by microwave and conventional processing," *Materials Letters*, 28 (1996), pp. 11–15.

Y. Fang, et al., "Fabrication of transparent hydroxyapatitie ceramics by ambient–pressure sintering," *Materials Letters*, 23 (1995), pp. 147–151.

Dinesh K. Agrawal, et al., "Fabrication of Hydroxyapatite Ceramics by Microwave Processing," *Mat. Res. Soc. Symp. Proc.* vol. 269 (Microwave Processing of Materials III 1992) Materials Research Society, Pittsburg, (1992), pp. 231–236.

Rustum Roy et al., Microwave Processing: Triumph of Applications–Driven Science in WC–Composites and Ferroic Titanates, *Ceramic Transactions*, vol. 80 (1997), pp. 3–26.

Jiping Cheng, et al., "Fabricating Transparent Ceramics by Microwave Sintering," *Am. Ceram. Soc. Bull.* 79(9) 2000, pp. 71–74.

Cherrardi, et al., "Electric and magnetic field contribution to the microwave sintering of ceramics," *Electroceramics IV*, 4th International Conf. on Electronic Ceramics & Applications, Proceedings vol. II, (eds. Wasner, R., Hoffman, S., Bonnenberg, D. & Hoffmann, C.) RWTN, Aachen (1994) pp. 1219–1224.

* cited by examiner

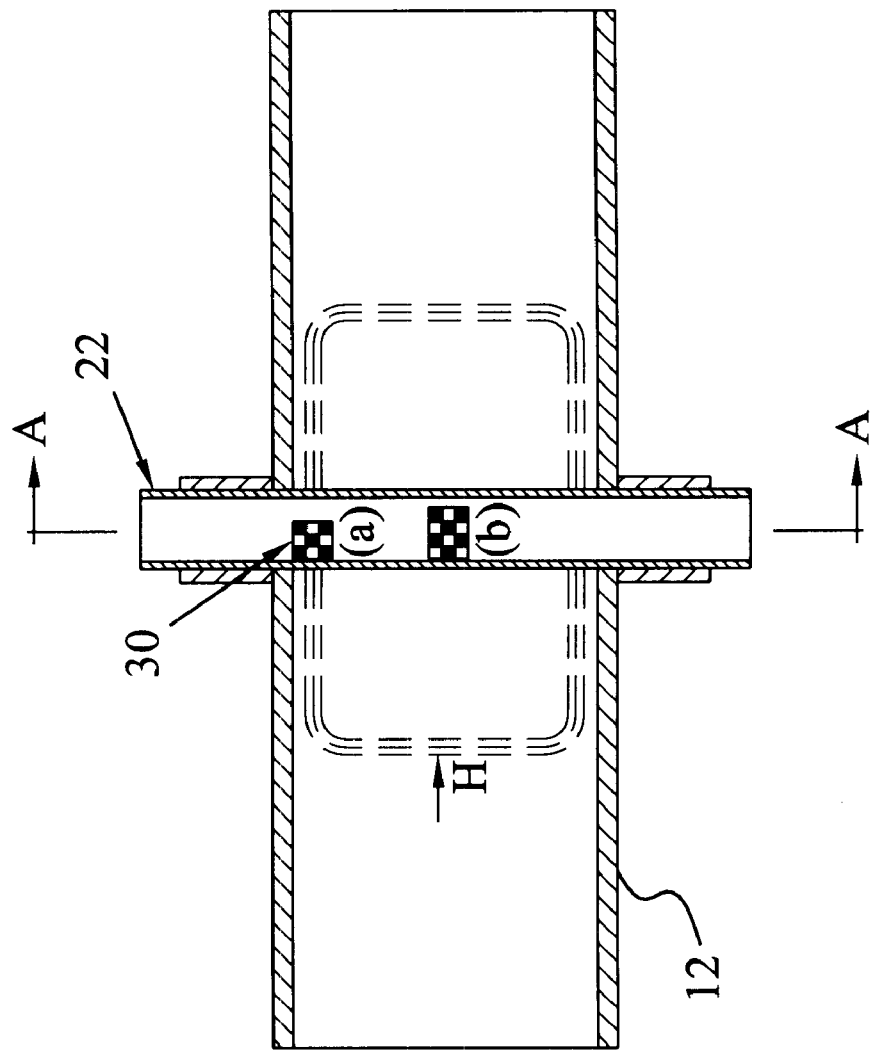

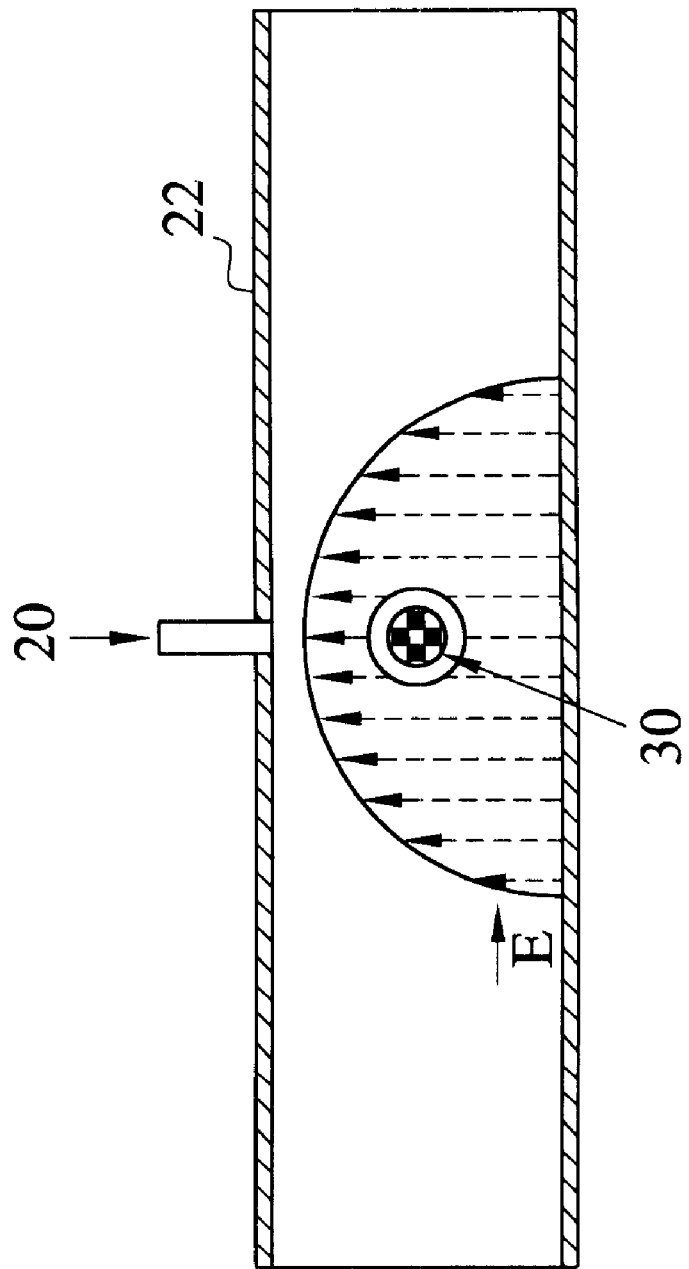

MICROWAVE PROCESSING IN PURE H FIELDS AND PURE E FIELDS

This application claims the benefit of U.S. Provisional Application No. 60/160,107, filed Oct. 18, 1999, entitled "Microwave Processing in Pure H Fields and Pure E Fields," which is hereby incorporated by reference in its entirety.

TECHNICAL FIELD

The present invention relates to methods for processing materials in the presence of microwave energy.

BACKGROUND

Application of microwave energy to process various kinds of materials in an efficient, economic, and effective matter, is emerging as an innovative technology. Microwave heating of materials is fundamentally different from conventional radiation-conduction-convection heating. In the microwave process, the heat is generated internally within the material instead of originating from external heating sources. Microwave heating is a sensitive function of the material being processed.

Microwaves are electromagnetic radiation with wavelengths ranging from 1 mm to 1 m in free space and frequency between approximately 300 GHz to 300 MHz, respectively. Today, microwaves at the 2.45 GHz frequency are used almost universally for industrial and scientific applications. The microwaves can be transmitted, absorbed, or reflected, depending on the material type with which they interact.

In conventional sintering processes, extremely high temperatures, long processing times and, in some cases, hot pressing or hot isostatic processing must be applied in the fabrication of products to achieve the highest density and minimum porosity. Conventional powder processing involves the compaction of a powder into the desired shape following by sintering. Typically, powders in the range of 1 to 120 micrometers are employed. The powder is placed in a mold and compacted by applying pressure to the mold. The powder compact is porous. Its density depends upon the compaction pressure and the resistance of the particles to deformation.

The powder compact is then heated to promote bonding of the powder particles. The sintering temperature is such as to cause atomic diffusion and neck formation between the powder particles. The diffusion process can yield a substantially dense body upon completion of the sintering cycle. Such a process is used in industry for a variety of products and applications.

Microwave sintering processes have unique advantages over conventional sintering processes. The fundamental difference is in the heating mechanism. In conventional heating, heat is generated by heating elements (resistive heating) and then transferred to samples via radiation, conduction and convection. In microwave heating, sample materials themselves absorb microwave power and then transform microwave energy to heat within the sample volume.

The use of microwave processing typically reduces sintering time by a factor of 10 or more. This minimizes grain growth. The fine initial microstructure can be retained without using grain growth inhibitors and hence achieve high mechanical strength. The heating rates for a typical microwave process are high and the overall cycle times are reduced by similar amounts as with the process sintering time, for example from hours/days to minutes. Microwave processing of materials has the potential to yield products having improved mechanical properties with additional benefits of short processing times and low energy usage.

Typical microwave processing procedures utilize a mixed electric field and magnetic field condition, with the sample placed into a chamber where it is exposed to both the electric field and the magnetic field generated by the microwaves. Cherrardi et al., in Electroceramics IV. Vol. II, (eds. Wasner, R., Hoffmann, S., Bonnenberg, D., & Hoffmann, C.) RWTN, Aachen, 1219–1224 (1994), published a paper indicating that both the magnetic field and electric field may contribute to the sintering of certain materials.

SUMMARY

One embodiment relates to a process including providing a microwave radiation source and a processing chamber. The process includes generating a region of pure magnetic field from the microwave radiation in the processing chamber. A region of pure electric field from the microwave radiation is also generated. A material is positioned in the region of pure magnetic field while no portion of the material is positioned in the region of pure electric field, and the material is heated in the region of pure magnetic field. In one aspect of certain related embodiments, the heating is conducted to sinter the material. In another aspect of certain related embodiments, the material includes a metal.

Another embodiment relates to a method including providing a microwave radiation source and a processing chamber. A first region of maximum magnetic field from the microwave radiation is generated in the processing chamber, and a second region of maximum electric field from the microwave radiation is generated in the processing chamber. A body is positioned in only one of the first region and the second region during a first time period. The body is positioned in the other of the first region and the second region during a second time period. In an aspect of certain related embodiments, a first portion of the body is heated during the first time period and a second portion of the body is heated during the second time period, wherein during the first time period the first portion is heated to a higher temperature than the second portion, and during the second time period the second portion is heated to a higher temperature than the first portion.

Another embodiment relates to a method for heating including providing a substrate having a layer of material thereon. One of the substrate and the layer is positioned in one pure field selected from the group consisting of a microwave generated pure magnetic field and a microwave generated pure electric field, during a first time period. The one of the substrate and the layer is heated layer to a temperature greater than that of the other.

BRIEF DESCRIPTION OF THE DRAWINGS

Certain embodiments of the invention are described with reference to the accompanying figures which, for illustrative purposes, are not necessarily drawn to scale.

FIG. 2(a) is a top sectional view of the cavity of the microwave system including a quartz tube therein.

FIG. 2(c) is a side sectional view illustrating a sample positioned in the electric field region and the location of the temperature monitor.

DETAILED DESCRIPTION

Figure 1:
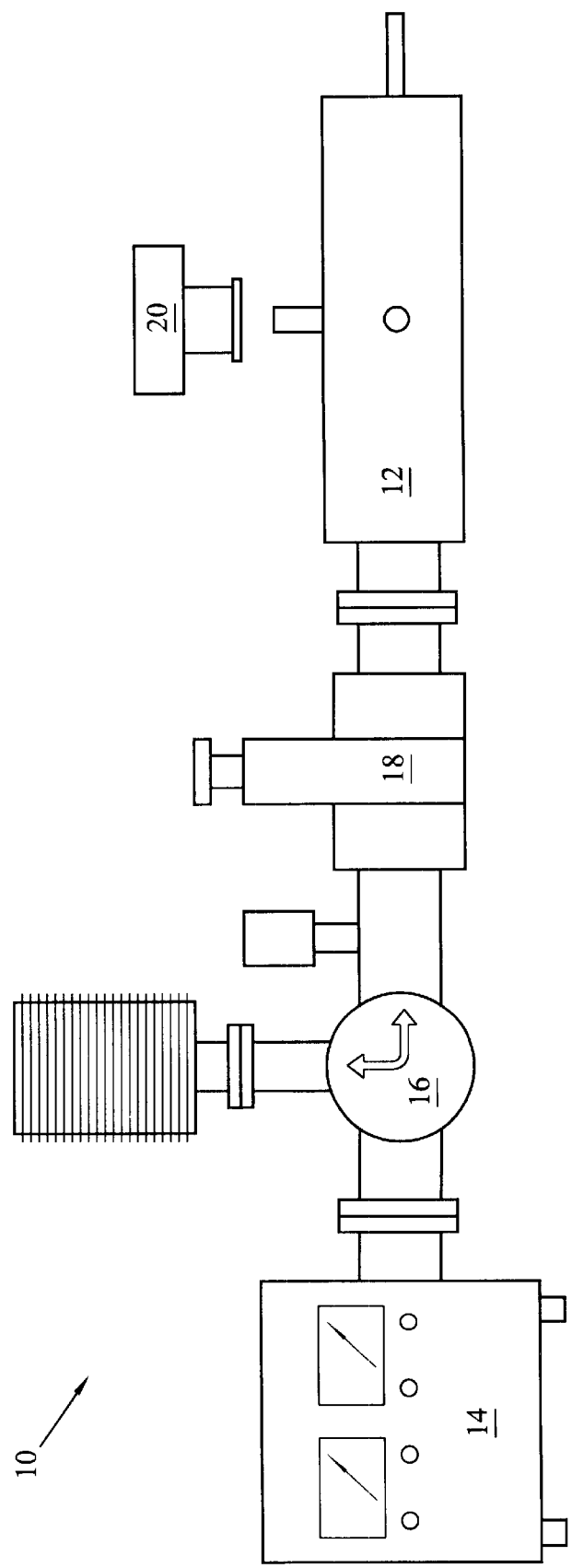
FIG. 1 is a schematic of a microwave system used for processing materials in magnetic and electric fields.

FIG. 1 illustrates a microwave system 10 including a finely tuned waveguided cavity 12 with a cross-sectional area of 86 mm by 43 mm which works in $TE_{103}$ single mode which was used to investigate the microwave heating of several materials in different microwave fields using a 2.45 GHz, 1.2 kW microwave generator 14 (Toshiba, Japan). The system also includes a circulator and water dummy load 16, a frequency tuner 18, microwave power monitor 18, and temperature monitor 20 (infrared pyrometer from Mikron Instrument Co., Model M90-BT with a temperature range of −50° C. to 1000° C.) connected to the cavity 12. A gas supply may also be connected for atmospheric control.

Figure 2B:
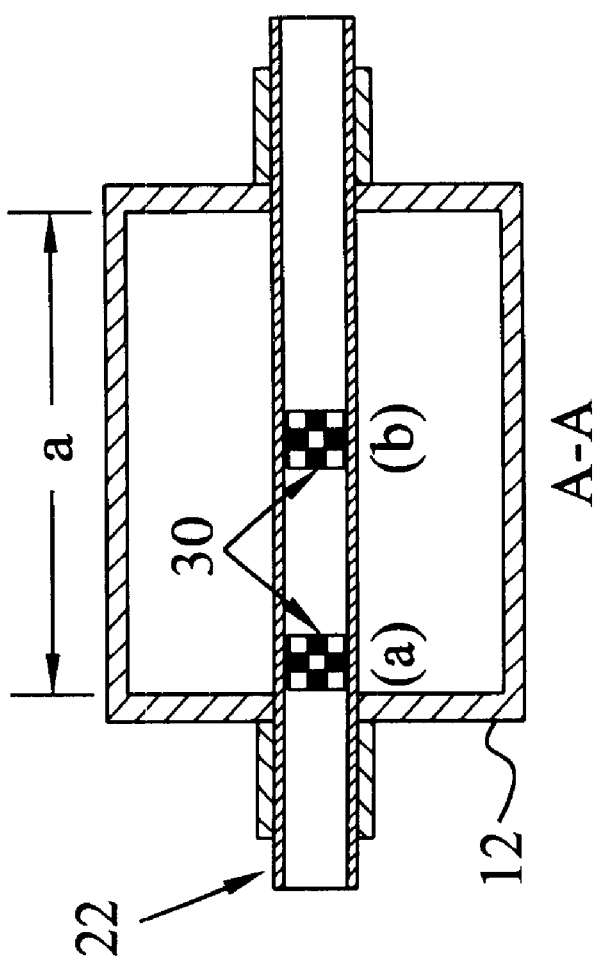
FIG. 2(b) is a view along the line A—A of FIG. 2(a).
Figure 2D:
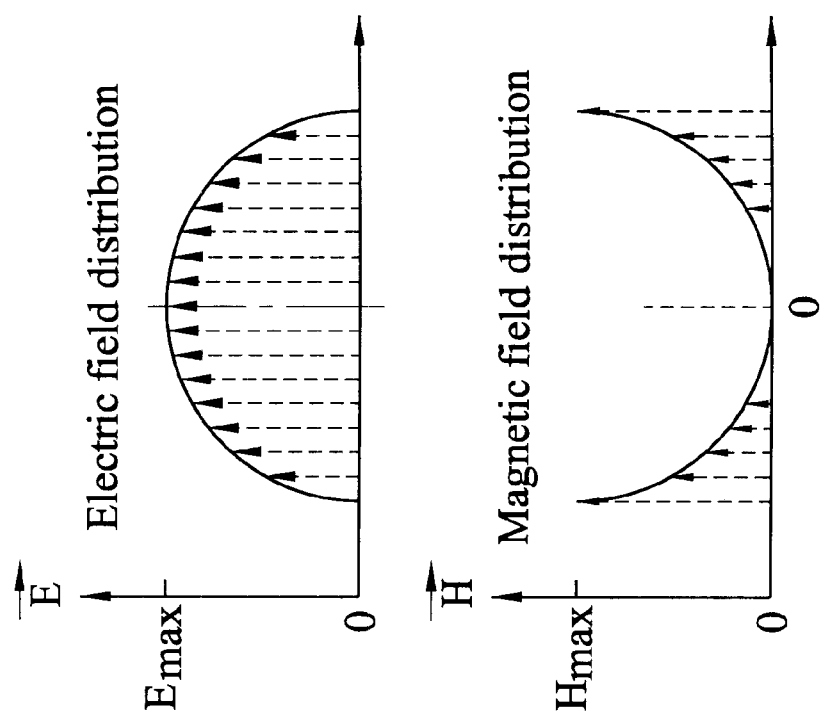
FIG. 2(d) illustrates the microwave field distribution within the $TE_{103}$ single mode microwave cavity along the length a shown in FIG. 2(b) and sample locations in the maximum magnetic H field region and the maximum electric E field region.

FIGS. 2(a)–2(d) illustrates the cavity 12 in more detail. The cavity is rectangular in cross-section and has a length a=12.4 cm. A quartz tube 22 is positioned in the cavity 12 to hold the sample 30 and to permit easy atmospheric control. As seen in FIGS. 2(a) and 2(b), the samples may be positioned at location (a) at the center of the chamber or at position (b) at the side wall of the cavity. FIG. 2(c) illustrates the position of the temperature monitor 20 when a sample 30 is positioned in the electric field region. FIG. 2(d) shows the electric field E and magnetic field H distributions along the length a (as seen in FIG. 2(b) of the chamber. In the location halfway along the length of the cavity, the maximum electric field is in the center of the cross-section, where the magnetic field is a minimum, and the maximum magnetic field is near the wall, where the electric field is at a minimum. During experimental processing runs nitrogen gas was passed through the tube 22 to avoid oxidation of metal samples at elevated temperatures.

A number of samples were prepared and sintered using the experimental set up described above. The samples were centered either at the electric field maximum node or at the magnetic field maximum node. The electric field maximum region and the magnetic field maximum region in the experimental set up described above are separated by about 6 cm, hence, the sample sizes of about 6.25 mm (¼ inch) diameter pellets are small. It should be noted that depending on the size of the sample, it is possible that the entire sample may not lie at the absolute maximum of the magnetic field or electric field. For example, if the maximum electric field is located at the center point of the cavity, then part of the sample may be positioned exactly at the center point, and part of the sample may be positioned slightly adjacent to the center point. As such, the part that is positioned slightly adjacent may not be exposed to the maximum electric field and minimum magnetic field. As a result, when the samples are described herein as being positioned at a "maximum" field region or a "minimum" field region, or at a "pure" field region, it is understood that a portion of the sample may be positioned slightly adjacent to the maximum field point, minimum field point, or pure field point.

Figure 3A:
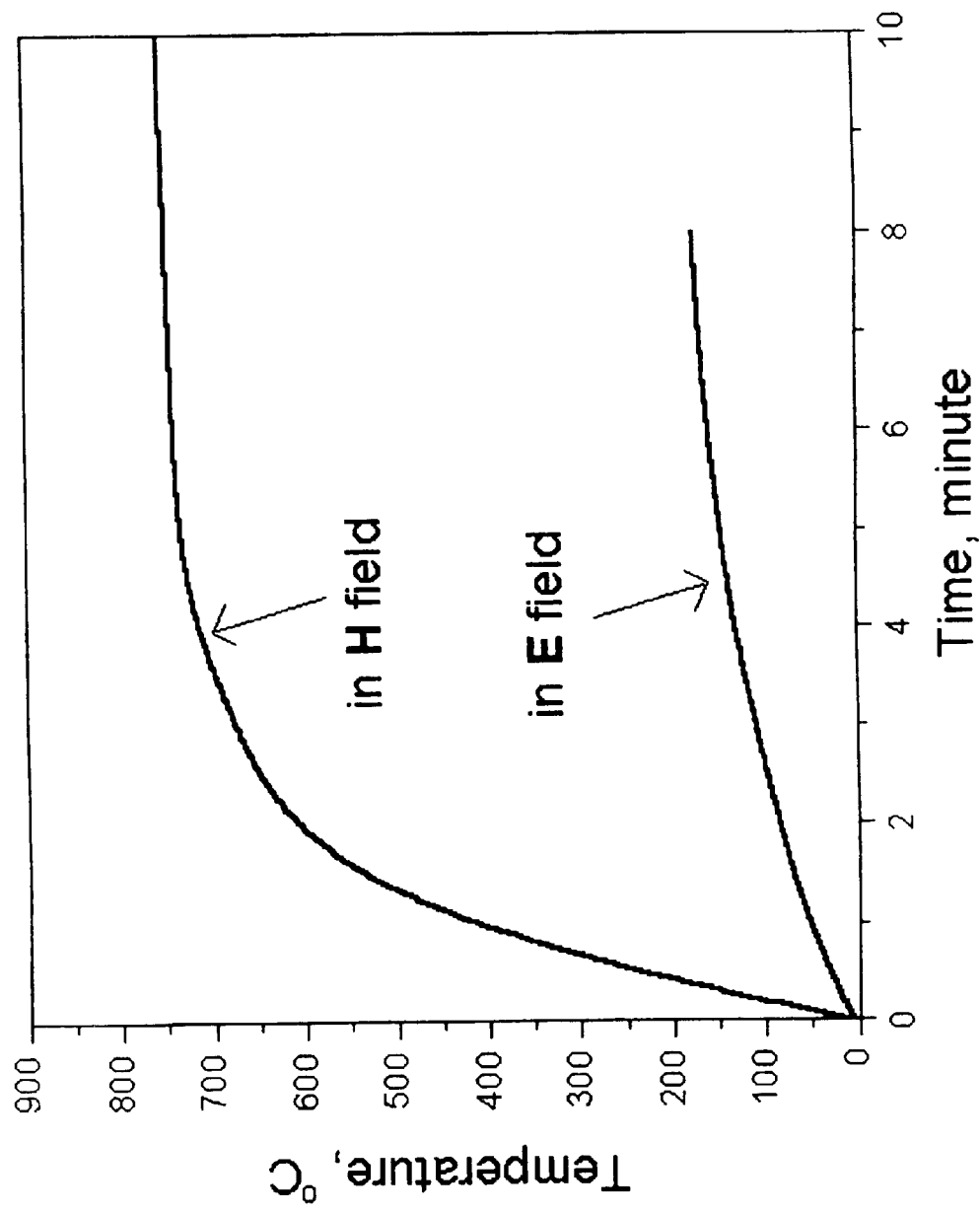
FIG. 3(a) illustrates a comparison of the heating rates of powdered metal compact (Fe-2%Cu-0.8% C) samples in different microwave fields.

A first sample was a commercial powdered metal having a composition of Fe-2 wt %Cu-0.8 wt %C (obtained from Keystone Powdered-Metal Company, Saint Marys, Pa.). In the pure or maximum electric field region, the sample reached a maximum temperature of 180° C. after being microwave heated for 8 minutes, as seen in FIG. 3(a). In the maximum magnetic field region, the sample heated up quickly and uniformly. The heating rate was higher than 300° C. per minute in the first two minutes, then it slowed down. The final temperature reading was 780° C. after 10 minutes.

Figure 3B:
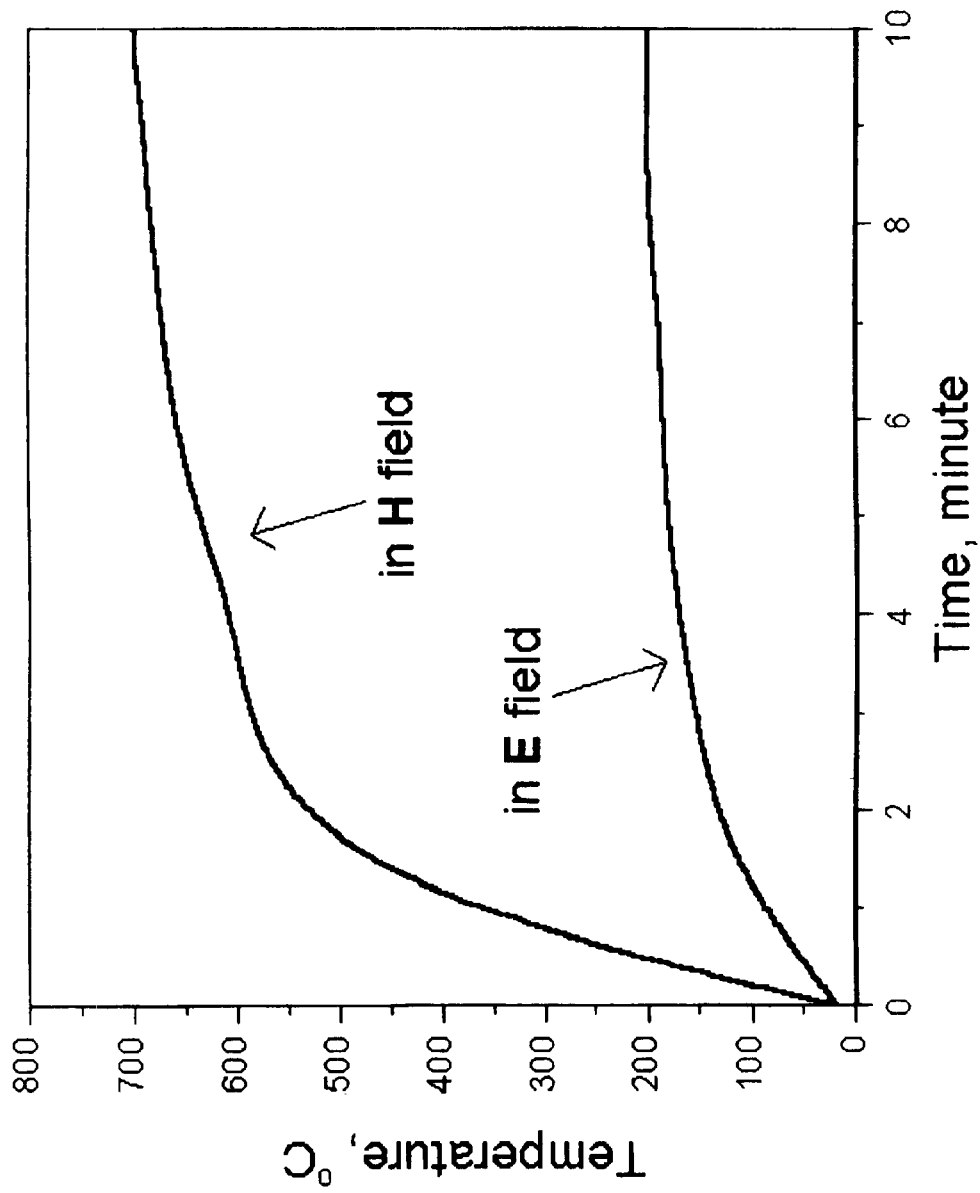
FIG. 3(b) illustrates a comparison of the heating rates of cobalt powder-compact samples in different microwave fields.

A cobalt powder-compact sample displayed similar behavior to the Fe-2 wt %Cu-0.8 wt %C sample described above. There was little heating effect in the maximum electric field region, with the sample reaching a temperature of only about 150–200° C. in 10 minutes. There was a high heating rate in the maximum magnetic field region, with the sample reaching a temperature of about 550° C. in about 2 minutes, and further increasing to a temperature of about 700° C. at 10 minutes, as seen in FIG. 3b.

Figure 3C:
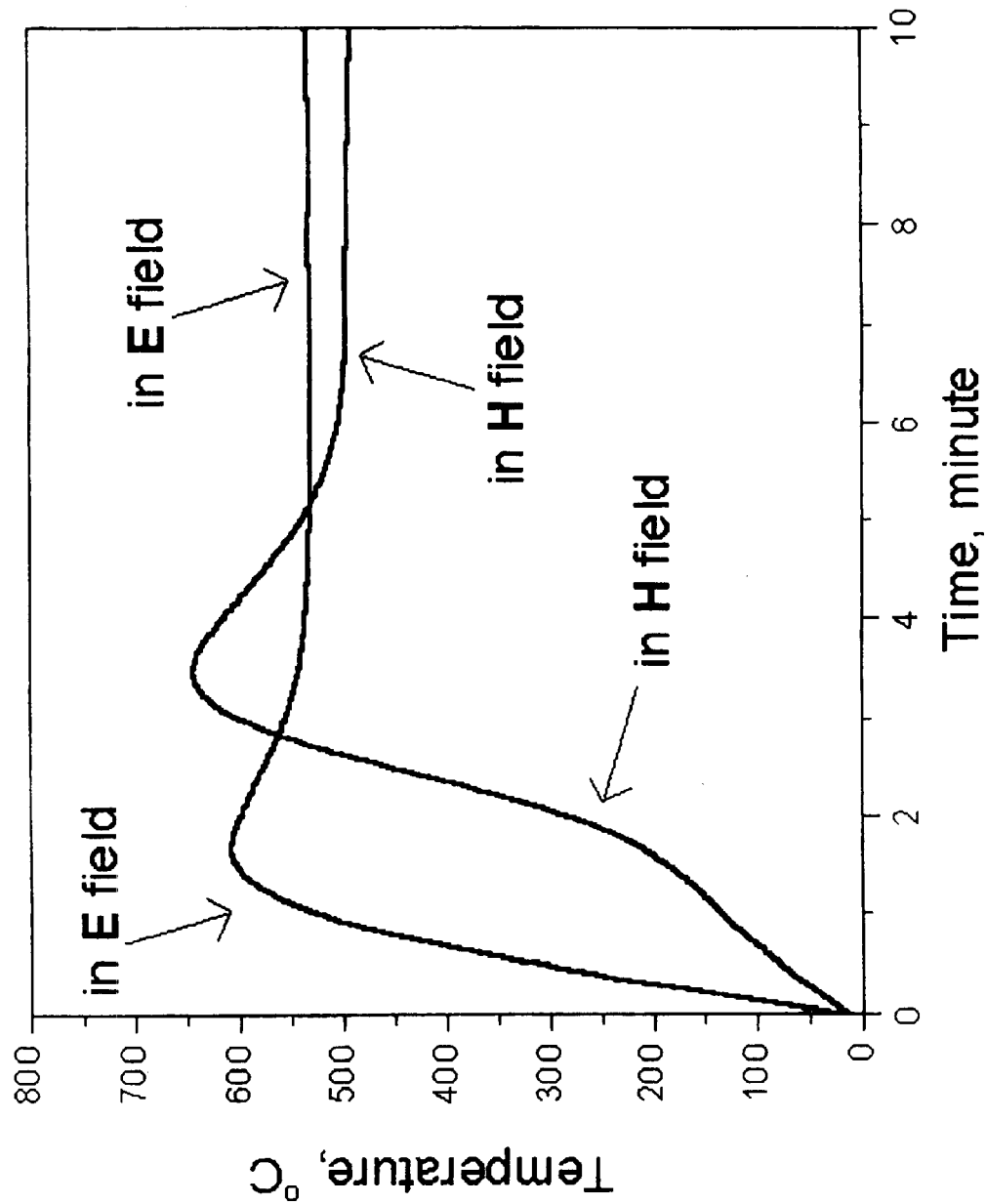
FIG. 3(c) illustrates a comparison of the heating rates of copper powder-compact samples in different microwave fields.

A copper powder-compact sample was also tested and displayed fast heating when placed in the maximum electric field region and when placed in the maximum magnetic field region. As seen in FIG. 3c, the sample temperature rose to about 600–700° C. and then dropped down to ~500° C. and remained within the range of about 500–550° C. during the heating. In the maximum electric field region, the sample reached maximum temperature in about 1–2 minutes. In the magnetic field region, the same reached maximum temperature in about 3–4 minutes.

Figure 3D:
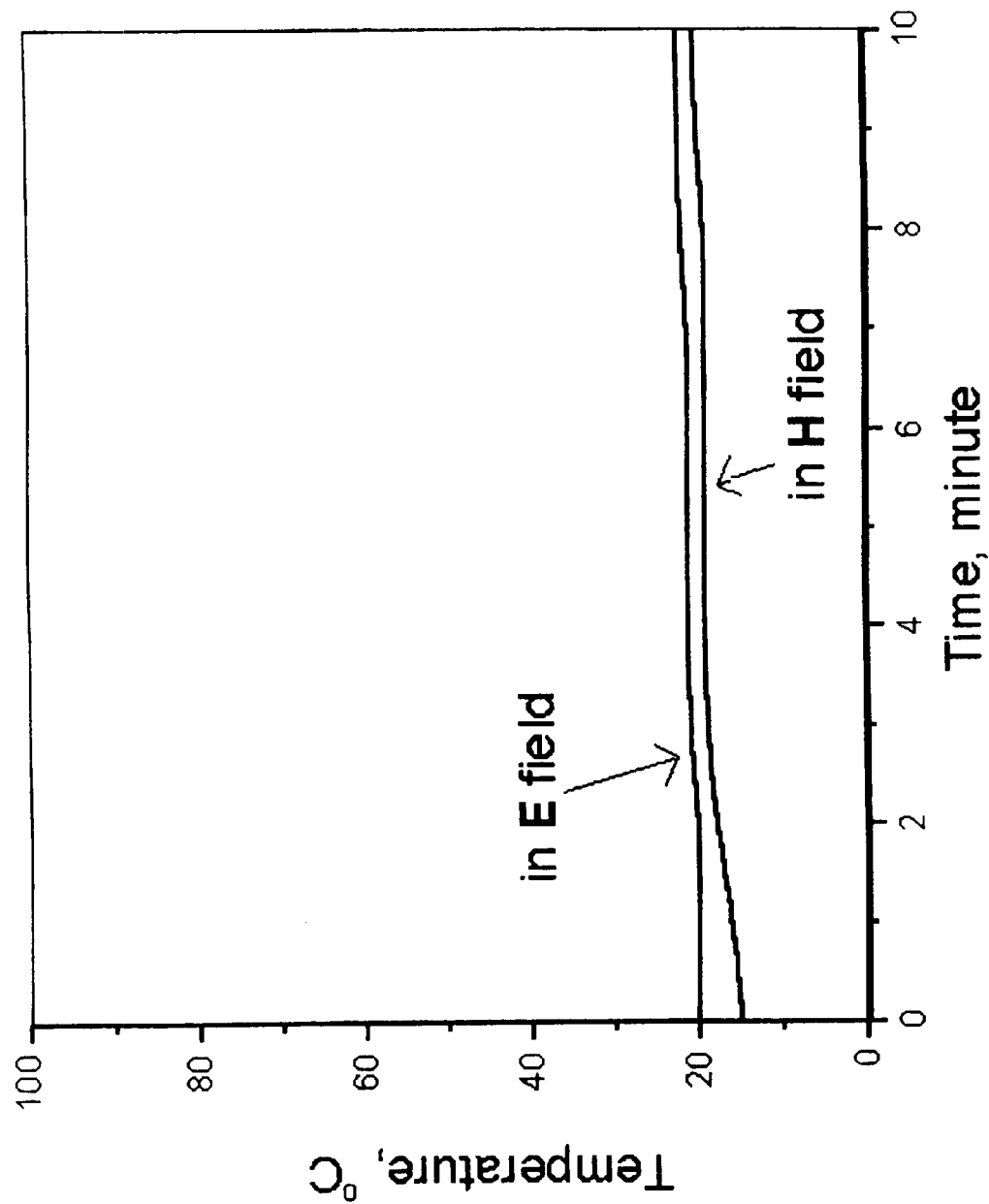
FIG. 3(d) illustrates a comparison of the heating rates of solid copper rod samples in different microwave fields.

For comparison to the copper powder-compact sample, a solid copper bar with the same shape and size was tested to determine its energy absorption and heating behavior (FIG. 3d). There was little or no temperature rise in the solid copper bar in either the maximum electric field region or the maximum magnetic field region. After being exposed in the microwave field for 10 minutes, the sample remained at room temperature, as seen in FIG. 3d.

Figure 3E:
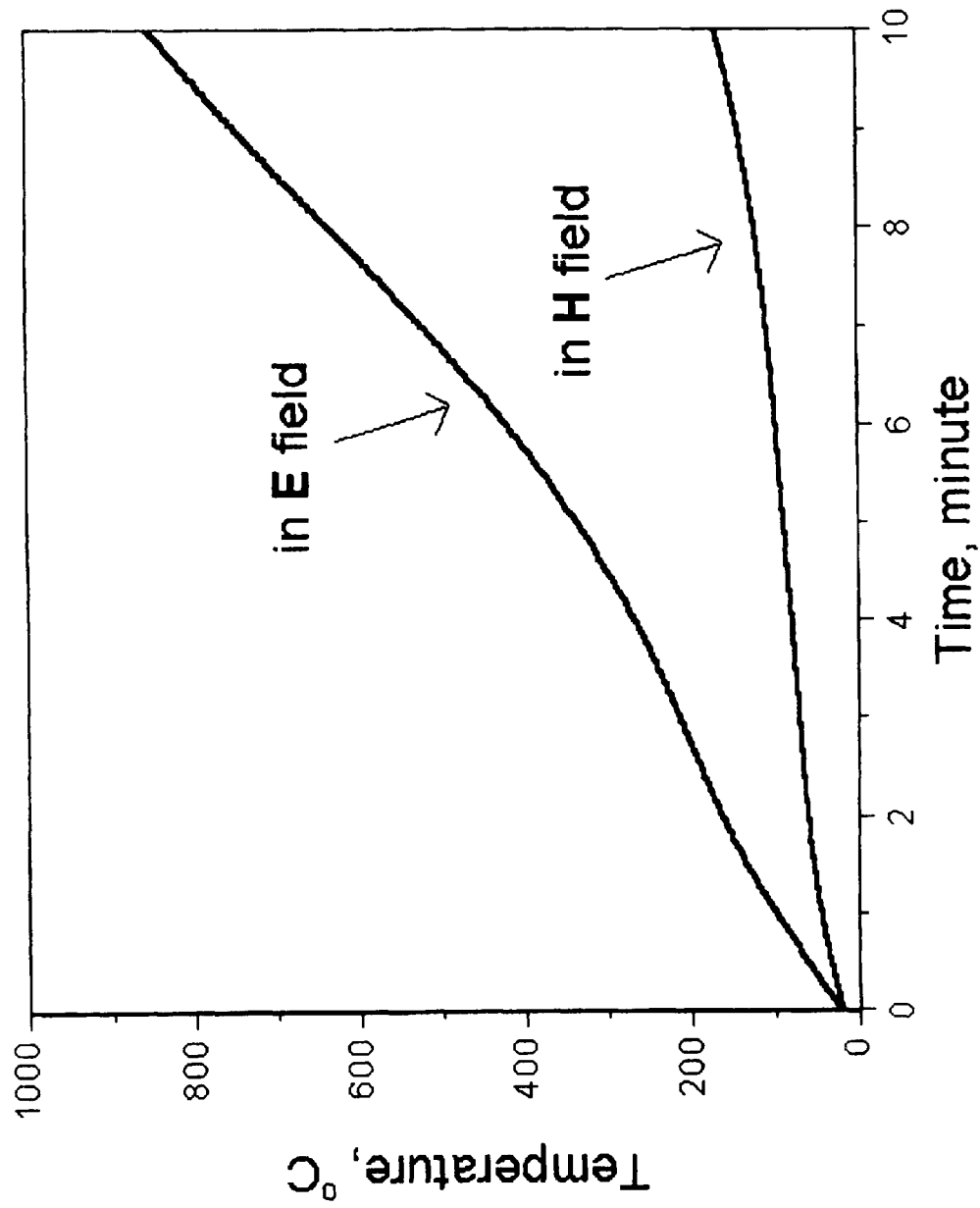
FIG. 3(e) illustrates a comparison of the heating rates of alumina powder-compact samples in different microwave fields.

Non-metal samples were also tested. Alumina is a typical ceramic material with excellent dielectric properties. Alumina usually has a very low dielectric loss, and it is generally not easy to heat up by microwaves, particularly at lower temperatures. Since the dielectric loss of alumina increases with temperature, microwave heating of alumina becomes more efficient at high temperature. Alumina powder-compact samples doped with 0.05 wt % MgO (from Baikowski International, Charlotte, N.C.) were tested (FIG. 3e). In the maximum electric field region, the heating rate speeded up after the sample reached a temperature of about 400–500° C. In the maximum magnetic field region, the alumina sample barely heated up, as seen in FIG. 3e.

Figure 3F:
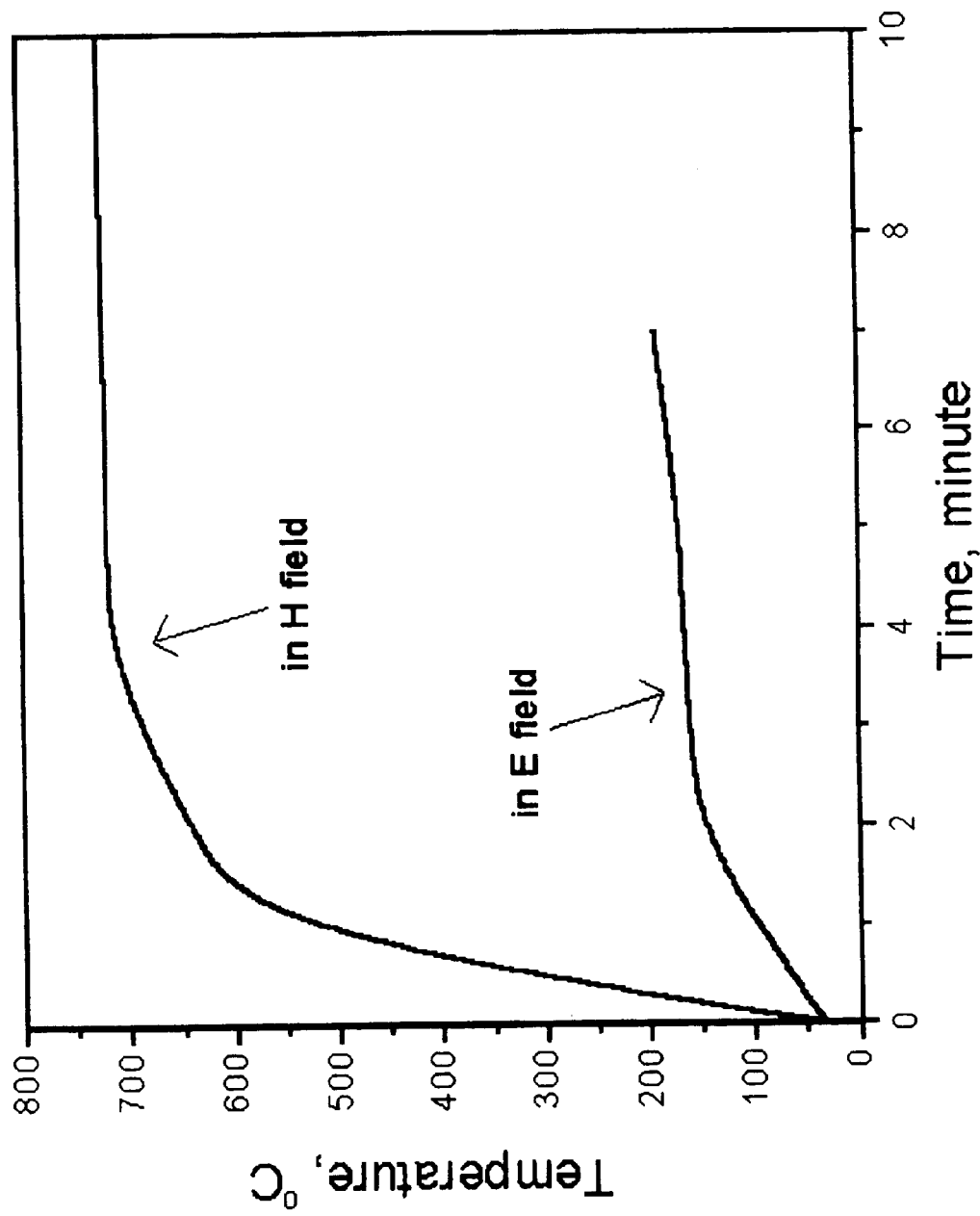
FIG. 3(f) illustrates a comparison of the heating rates of tungsten carbide powder-compact samples in different microwave fields.
Figure 3G:
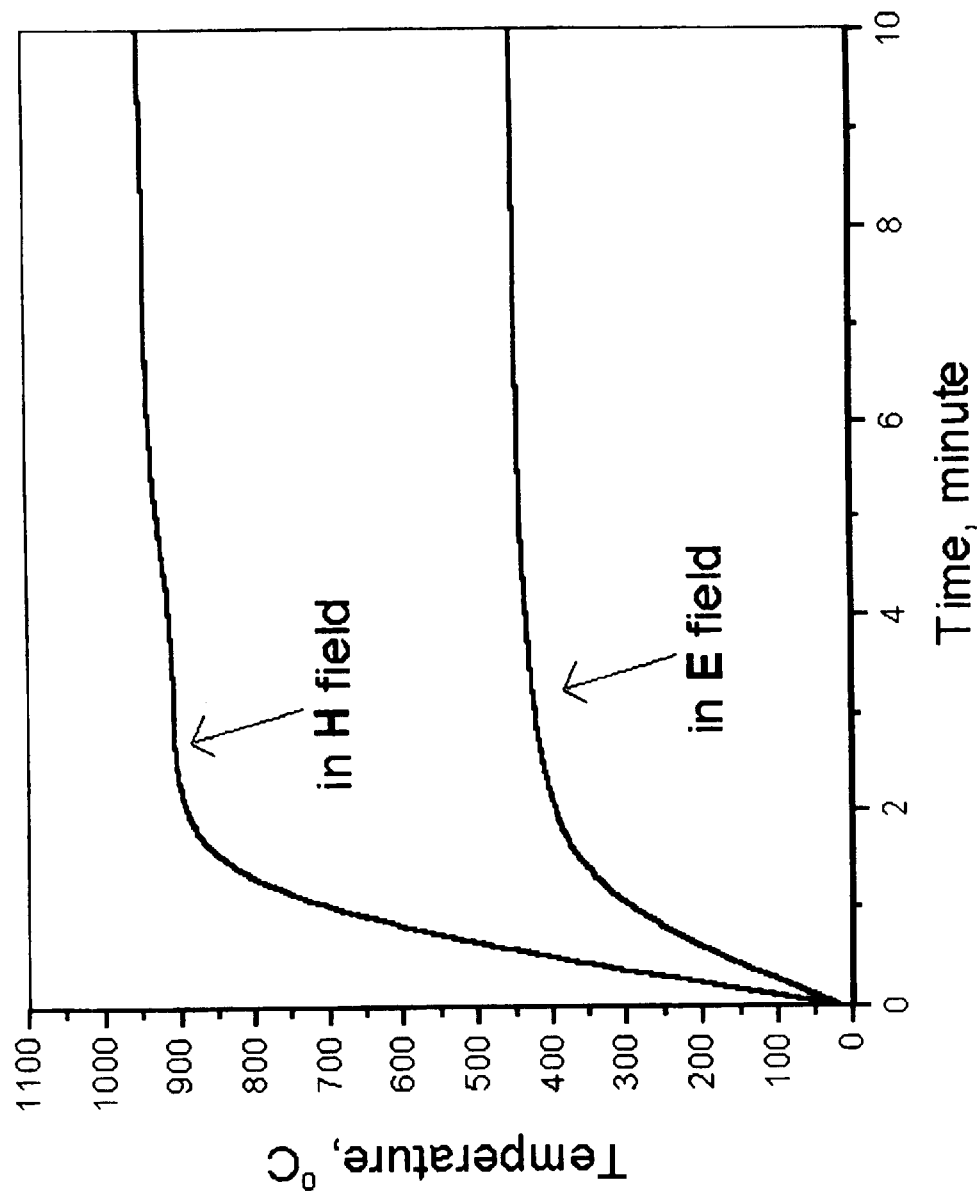
FIG. 3(g) illustrates a comparison of the heating rates of alumina-metal composite powder-compact samples in different microwave fields.
Figure 3H:
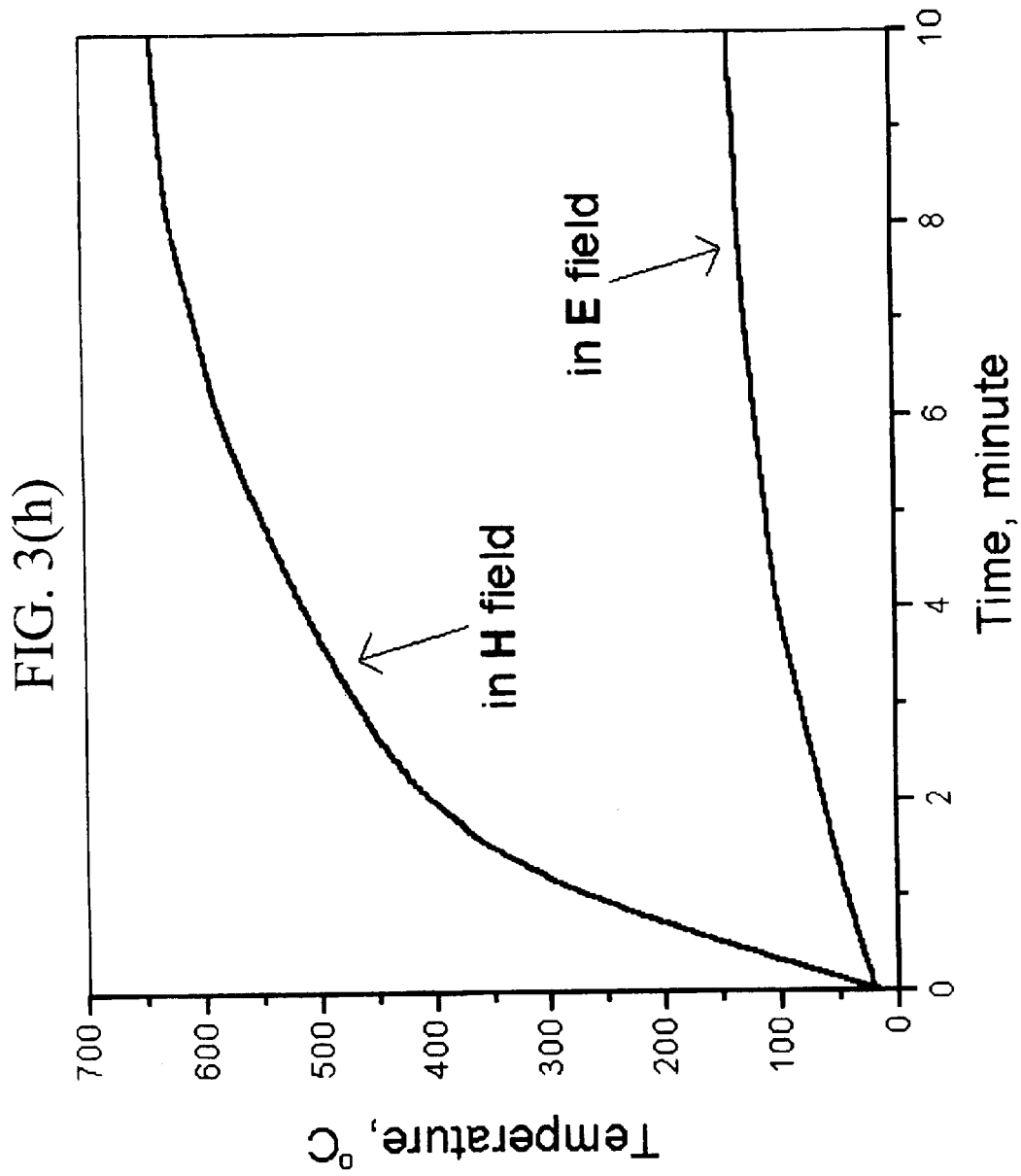
FIG. 3(h) illustrates a comparison of the heating rates of tungsten carbide-cobalt powder-compact samples in different microwave fields.

Tungsten carbide (from Teledyne) powder-compact samples were also tested. The WC samples exhibited different behavior than the alumina samples. As seen in FIG. 3f, the heating rate was rapid in the maximum magnetic field region, reaching a maximum of about 700° C. in 3–4 minutes and then leveling out. In the maximum electric field region, the heating rate was slow, and after 7 minutes of heating the sample temperature was only about 180° C. and there was some electrical discharging around the sample.

Two types of composite samples were also tested, including alumina-powdered metal (50% $Al_2O_3$ and 50% (Fe-2 wt %Cu-0.8 wt %C)) and tungsten carbide-cobalt (WC-10%Co).

For the alumina-metal composition, in the maximum magnetic field region, the sample was rapidly heated to a temperature of about 900° C. in about 1–2 minutes and then leveled out. In the maximum electric field region, the reached a temperature of about 400° C. in about 2 minutes and then leveled out.

For the tungsten carbide-cobalt sample, in the maximum magnetic field region, the sample was rapidly heated to a temperature of about 400° C. in about 2 minutes and then continued to increase to a temperature of about 650° C. in 10 minutes. In the maximum electric field region, the sample was barely heated at all, reaching a temperature of about 100° C. in 10 minutes.

It should be noted that there was no insulation placed around the samples, and as such, thermal loss was likely significant at the higher temperatures, leading to lower heating rates at the higher temperature ranges. In addition, for the experimental set-up described above, it is believed that placing the center of the sample within about 3 mm of the maximum or minimum field point will yield similar results. In addition, a fixed microwave power for testing runs was not used because for some samples, the temperature increase was too fast to be measured with the pyrometer, and for certain conditions, discharging and arcing occurred. As a result, the samples were tested at the powers set forth in Table 1 below.

TABLE I

Microwave power applied to test materials.

| Test Material | Microwave Power (W) |
| --- | --- |
| powdered metal compact (Fe-2% Cu-0.8% C) samples | 200 |
| cobalt powder-compact samples | 150 |
| copper powder-compact samples | 150 |
| solid copper rod samples | 150 |
| alumina powder-compact samples | 180 |
| tungsten carbide powder-compact samples | 150 |
| alumina-powder-compact metal composite samples | 120 |
| tungsten carbide-cobalt powder-compact samples | 200 |

From the above results, it is apparent that different materials have different heating behaviors in the electric and magnetic field regions, and that exposure to either the electric field alone or the magnetic field alone can be used for processing a variety of materials. In general, the higher conductivity samples, such as the powdered metal sample, can be more rapidly and efficiently heated in the maximum magnetic field region. The pure ceramic alumina sample with low conductivity exhibited a more rapid and efficient heating rate in the maximum electric field region.

Figure 4:
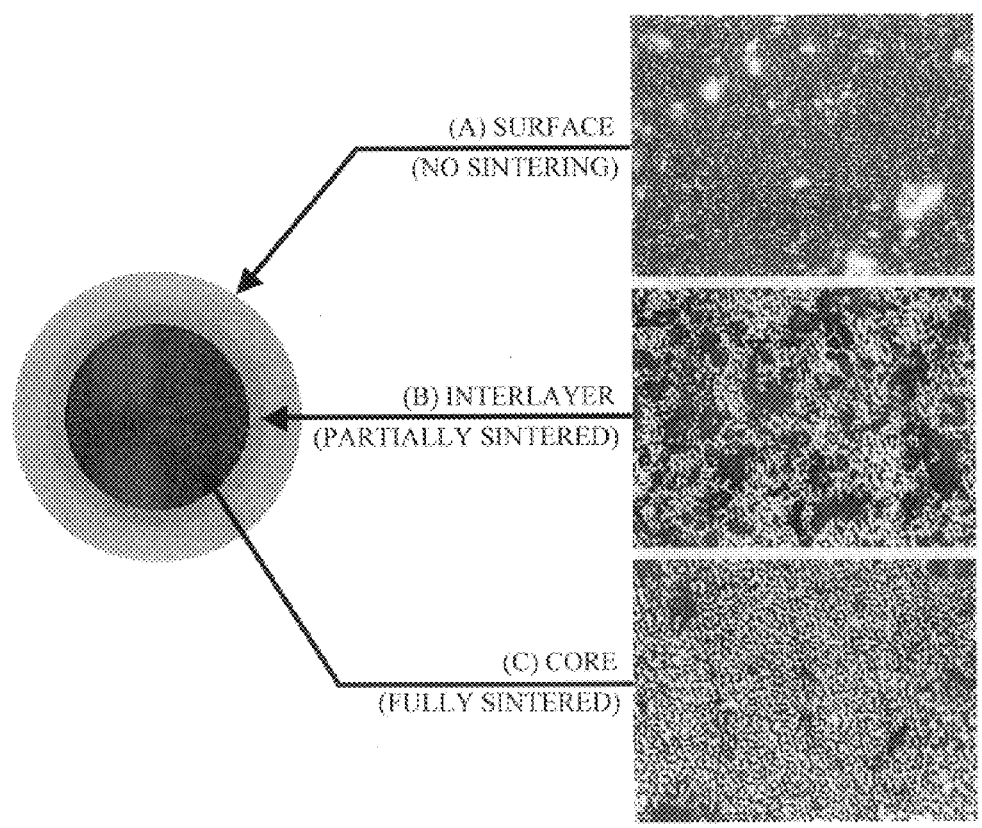
FIG. 4 illustrates the sintering of a pure Cu powder metal compact including a fully sintered core, a partially sintered interlayer and a surface layer.
Figure 5:
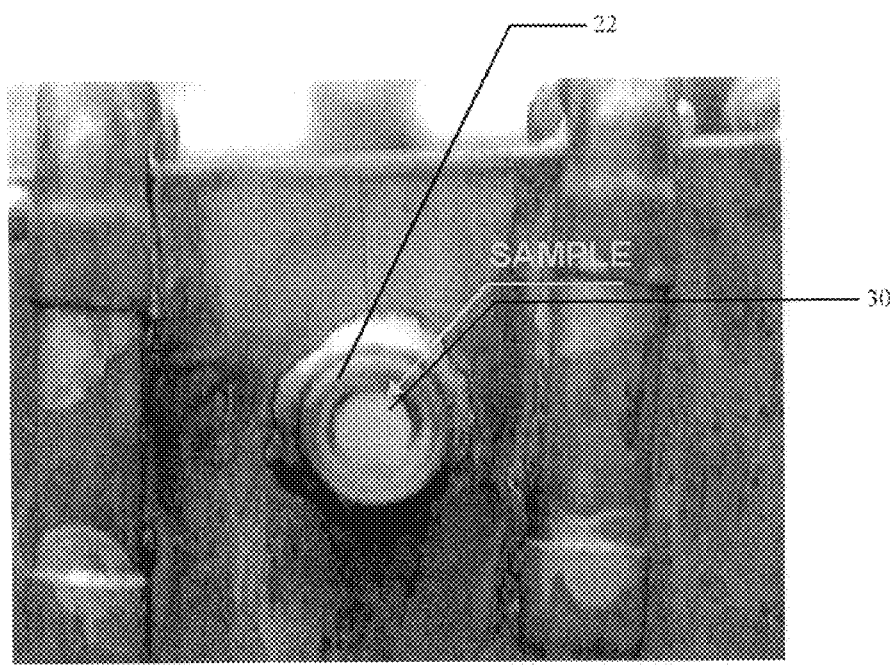
FIG. 5 illustrates an example of microwave heating of a Fe—Cu—C powder-compact metal sample in a magnetic field region according to an embodiment of the present invention.

FIG. 4 illustrates microstructures of a pure Cu powder compact microwave heated in the maximum magnetic field region for 10 minutes, including (A) surface region with no sintering and considerable porosity; (B) interlayer region with little sintering and some porosity; and (C) core region fully sintered with little or no porosity. FIG. 5 shows a portion of the experimental set-up during microwave heating of a Fe—Cu—C powdered metal sample in the maximum magnetic field region.

Embodiments may find application in a variety materials processing applications. For example, for certain types of electronic devices it may be desirable to heat only a portion of the device. By properly positioning the device, a particular portion may be subjected to the maximum magnetic field or electric field region in order to heat up the particular portion. One example of an application would be to heat a metal deposited on a ceramic substrate. By subjecting the metal to the magnetic field region, it may be possible to heat the metal while the ceramic is not heated, due to the different interactions of the metal and the ceramic with the magnetic field. Such a process may be suitable for activating catalysts, processing semiconductor devices, forming coating, etc., where different materials can be heated differently depending on their interactions with the magnetic field or electric field generated by the microwave processing system. Numerous materials may be processed according to embodiments of the present invention, including, but not limited to metals, ceramics, semiconductors, superconductors, polymers, composites and glasses. The term metals includes not only pure metals but also other materials having metallic properties, such as alloys.

In semiconductor processing, it is sometimes necessary to heat a particular layer in order to, for example, activating a dopant, annealing a metal, causing reflow of an electrode, etc. Microwave processing by exposing the necessary region to a separate essentially pure magnetic field and/or electric field enables one region to be heated while other regions, which may be damaged by heat, are kept at a lower temperature. In addition, it is possible to configure a processing system so that a sample can be moved through the regions of maximum magnetic and/or electric field as desired. Such a system may be a stand alone processing system or attached to a larger processing system having multiple processing chambers, such as a semiconductor processing cluster tool.

It will, of course, be understood that modifications of the present invention, in its various aspects, will be apparent to those skilled in the art. The scope of the invention should not be limited by the particular embodiments described herein. Other embodiments are possible, their specific features depending upon the particular application.

What is claimed:

1. A process comprising:
   providing a microwave radiation source and a processing chamber;
   generating a region of pure magnetic field from said microwave radiation in said processing chamber;
   generating a region of pure electric field from said microwave radiation;
   positioning a material in said region of pure magnetic field while no portion of said material is positioned in said region of pure electric field; and heating said material in said region of said pure magnetic field.

2. A method as in claim 1, wherein said heating is conducted to sinter said material.

3. A method as in claim 1, wherein said material is in a compacted powder form.

4. A method as in claim 3, wherein said material is one of ferromagnetic and ferromagnetic.

5. A method as in claim 3, wherein said material is not one of ferromagnetic and ferrimagnetic.

6. A method as in claim 1, wherein said material is selected from the group consisting of powdered and solid metals.

7. A method as in claim 1, wherein said material comprises a ceramic material.

8. A method as in claim 1, wherein said material comprises a semiconductor.

9. A method as in claim 1, wherein said material comprises a polymer.

10. A method comprising:

providing a microwave radiation source and a processing chamber;

generating a first region of maximum magnetic field from said microwave radiation in said processing chamber;

generating a second region of maximum electric field from said microwave radiation in said processing chamber;

positioning a body in only one of said first region and said second region during a first time period; and positioning said body in the other of said first region and said second region during a second time period.

11. A method as in claim 10, wherein said body comprises a composite material.

12. A method as in claim 10, wherein a first part of said body is heated during said first time period and a second part of said body is heated during said second time period, wherein during said first time period said first part is heated to a higher temperature than said second part, and during said second time period said second part is heated to a higher temperature than said first part.

13. A method as in claim 12, wherein said first part comprises a metal and said second part comprises a ceramic.

14. A method as in claim 12, wherein said first region comprises a semiconductor.

* * * * *

UNITED STATES PATENT AND TRADEMARK OFFICE
CERTIFICATE OF CORRECTION

PATENT NO. : 6,365,885 B1
DATED : April 2, 2002
INVENTOR(S) : Roy et al.

It is certified that error appears in the above-identified patent and that said Letters Patent is hereby corrected as shown below:

<u>Column 1,</u>
Line 7, after "entirety." please add the following:
-- This invention was made with support from the U.S. Government under Contact No. N00014-98-1-0752. The U.S. Government has certain rights in the invention. --

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,365,885 B1
APPLICATION NO. : 09/691379
DATED : April 2, 2002
INVENTOR(S) : Roy et al.

It is certified that error appears in the above-identified patent and that said Letters Patent is hereby corrected as shown below:

In the specification

Please add the following heading and paragraph on page 1, line 7, following the title:

STATEMENT OF GOVERNMENT SPONSORSHIP

This invention was made with government support under Contract No. N00014-98-1-0752, awarded by the Office of Naval Research. The Government has certain rights in the invention.

Signed and Sealed this
Seventh Day of June, 2016

Michelle K. Lee
*Director of the United States Patent and Trademark Office*